United States Patent Office 3,492,029
Patented Jan. 27, 1970

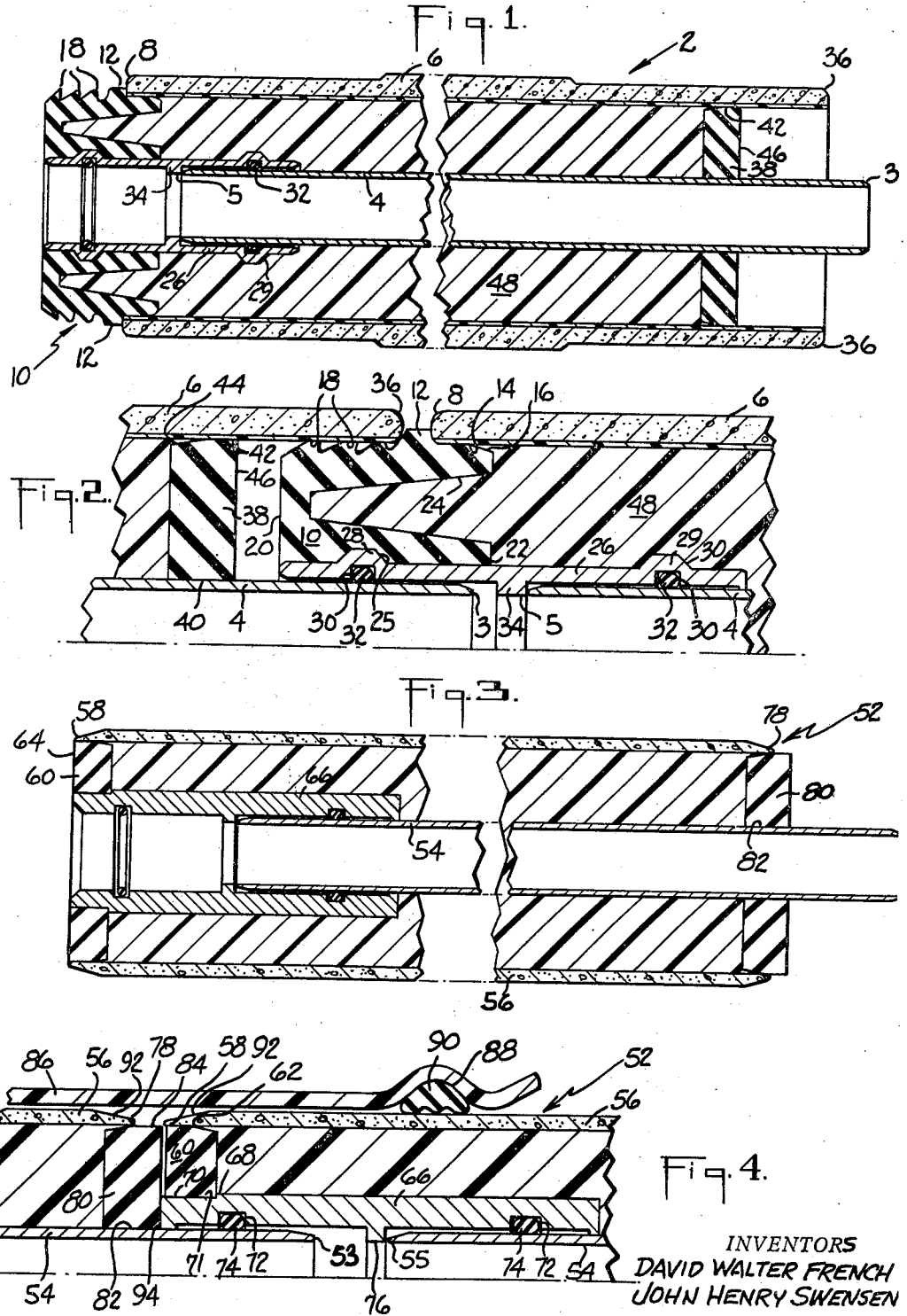

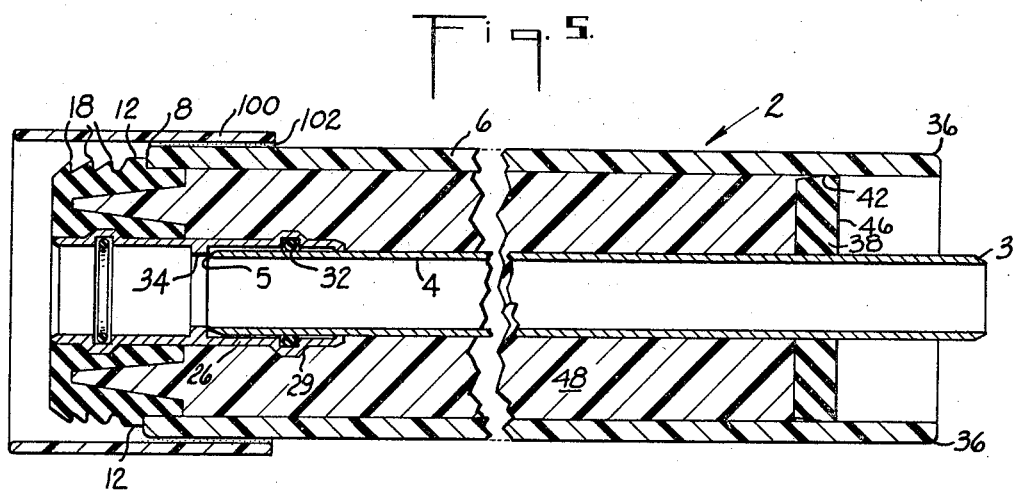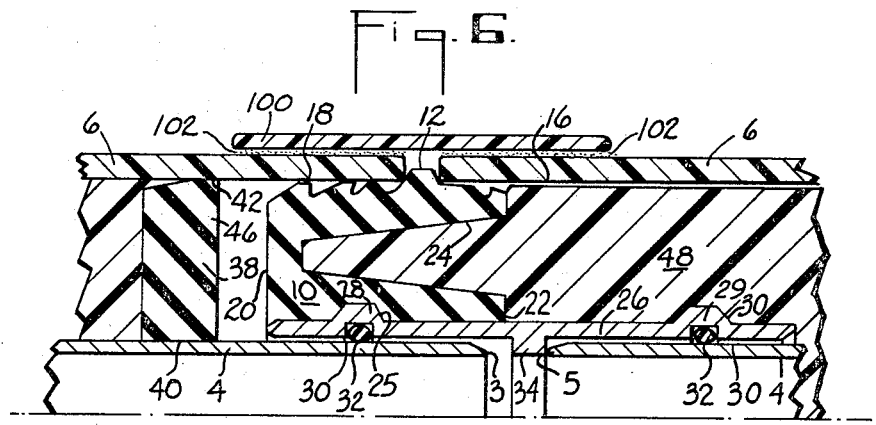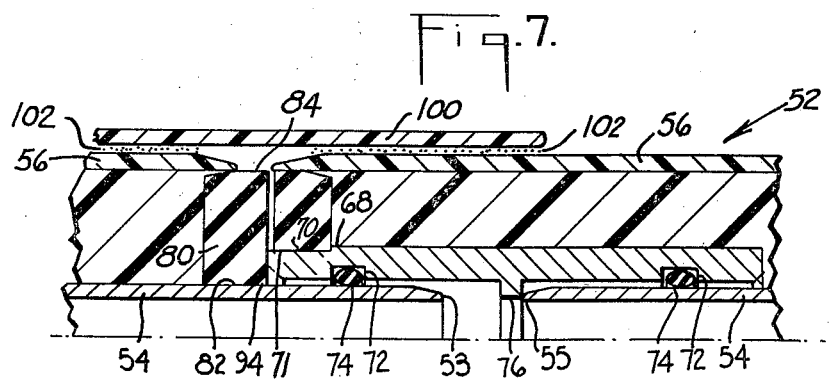

3,492,029
THERMALLY INSULATED PIPE
David Walter French and John Henry Swensen, Somerville, N.J., assignors to Johns-Manville Corporation, New York, N.Y., a corporation of New York
Continuation-in-part of application Ser. No. 604,783, Dec. 27, 1966. This application Nov. 18, 1968, Ser. No. 787,286
Int. Cl. F16l 11/12, 59/16
U.S. Cl. 285—47    16 Claims

ABSTRACT OF THE DISCLOSURE

A factory fabricated thermally insulated pipe having a readily assembled push-in rubber ring joint for its inner metallic pipe and a readily assembled push-in joint for its outer pipe wherein both joints are assembled automatically in one operation.

BACKGROUND OF THE INVENTION

Field of the invention

This application is a continuation-in-part of my co-pending application Ser. No. 604,783, filed Dec. 27, 1966 now abandoned.

This invention relates to a thermally insulated pipe. More particularly, the invention is directed to thermally insulated pipes which are provided with a readily assembled and good joint so that a thermally insulated piping system may be formed using thermally insulated pipes and couplings which are factory fabricated.

DESCRIPTION OF THE PRIOR ART

Thermally insulated pipe systems, especially those for relatively small diameter pipe, generally comprise an inner metallic pipe such as copper or stainless steel and an outer plastic carrier pipe. The inner and outer pipes are held in coaxial relationship by a plurality of spacers to form an annular space between the outer surface of the inner pipe and the inner surface of the outer pipe. This annular space is then filled with thermal insulating material. It has been the practice to form these pipes so that the inner pipe has an axial extent longer than the axial extent of the outer pipe. In this structure, a short section of the inner pipe is available at each axial extremity of the thermally insulated pipe for use in joining adjacent pipes. The axial extremities of the sections of the adjacent inner pipes are joined together in the field, as by soldering, and the joined sections are covered with a thermal insulating material. This field soldering and wrapping of thermal insulating material is particularly bothersome in the installation of underground pipe systems and expensive since two different types of labor, a pipe fitter and a thermal insulator, are involved. Another problem associated with pipe systems of this nature is the necessity of providing for the thermal expansion and contraction of the inner pipe. This is particularly true in those systems designed for conveying alternatively hot or cold fluids. In long runs, this problem requires field expansion loops, and in short runs, a complicated thermal expansion joint must be provided.

BRIEF SUMMARY OF THE INVENTION

An object of this invention is to provide a factory fabricated thermally insulated pipe having a good joint which may be readily assembled in the field.

Another object of this invention is to provide a factory fabricated thermally insulated pipe having a good joint which may be readily assembled in the field and provide automatically for the expansion and contraction of the pipe at each joint.

The foregoing objects are accomplished by the instant invention with a thermally insulated pipe comprising coaxial inner and outer pipes having thermal insulating material therebetween and wherein the inner pipe is provided adjacent one axial extremity with a coupling and adjacent its other axial extremity with a freely exposed end section which is adapted to be inserted into a coupling carried by an adjacent thermally insulated pipe. The seal between the end section of the inner pipe and the coupling of the adjacent pipe is accomplished through a sealing ring carried in an annular groove in the coupling or pipe end. The coupling and the end section cooperate to provide a readily assembled joint and are further provided with automatic means to provide suitable allowance for the expansion or contraction of the thermally insulated pipe. Furthermore, the coupling and the inner pipe are designed and constructed in relation to the outer pipe so that thermal insulating material for the joint area is provided automatically during the completion of the joint and, therefore, permits the complete factory fabrication of the thermally insulated pipe. Thus, the thermally insulated pipe of the instant invention eliminates the major shortcomings of the pipe systems previously offered for this service.

BRIEF DESCRIPTION OF THE DRAWINGS

This invention will be more fully understood and further objects and advantages thereof will become apparent when reference is made to the following detailed description of a preferred embodiment of the invention and the accompanying drawings in which:

FIG. 1 is a view partially in cross-section of a thermally insulated pipe made in accordance with the instant invention;

FIG. 2 is a view partially in cross-section of a joint between ends of adjacent pipes of the type illustrated in FIG. 1;

FIG. 3 is a view partially in cross-section of another embodiment of the instant invention of a thermally insulated pipe;

FIG. 4 is a view partially in cross-section of the joint between ends of adjacent pipe illustrated in FIG. 3;

FIG. 5 is a view partially in cross-section of thermally insulated pipe of the type illustrated in FIG. 1 provided with thrust resistant means;

FIG. 6 is a view partially in cross-section of a joint between ends of adjacent pipe of the type illustrated in FIG. 1; and FIG. 7 is a view partially in cross-section of the joint between ends of adjacent pipes of the type illustrated in FIG. 3 provided with thrust resistant means.

DESCRIPTION OF THE PREFERRED EMBODIMENT

Referring to the drawings, and in particular to FIGS. 1 and 2, there is illustrated a thermally insulated pipe 2 comprising an inner pipe 4 and an outer pipe 6. The inner and outer pipes may be made from any type of material commonly used in the formation of pipe, but in the preferred embodiment of the invention, as illustrated in FIGS. 1 and 2, the inner pipe 4 comprises a copper or stainless steel material and the outer pipe 6 comprises an asbestos-cement material. The outer diameter of the inner pipe 4 is less than the inner diameter of the outer pipe 6 so that when the inner and outer pipes are mounted in coaxial relationship, as illustrated in FIG. 1, an annular space exists between the outer surface of the inner pipe and the inner surface of the outer pipe.

Adjacent one axial extremity 8, the thermally insulated pipe 2 is provided with a coupling comprising an annular member 10. As illustrated particularly in FIG. 2, the outer surface of the annular member 10 has a protruding abutment 12 located between the axial extremities of the annular member 10. On one axial side of the abutment, the outer surface of the annular member 10 comprises a generally cylindrical section 14 having a diameter slightly greater than the inner diameter of the outer pipe 6. The section 14 is provided with a tapered or rounded entrance section 16 so that it may be readily inserted into the outer pipe 6 and then pushed into the outer pipe 6 until the axial extremity 8 contacts the nearest side of the abutment 12. On the other axial side of the abutment 12, the outer surface of the annular member 10 comprises a plurality of sealing lips 18 for a purpose to be described below. One axial end surface 20 of the annular member 10 is imperforate but its other axial end surface 22 is provided with a plurality of openings 24 extending axially into the annular member 10 from the surface 22. If desired, an annular space can be substituted for the plurality of openings 24. The inner surface of the annular member 10 is generally cylindrical but is provided with an annular groove 25 located between the axial extremities of the annular member 10.

The ends of adjacent inner pipe 4 are joined, as described below, by a coupling 26 which in the preferred embodiment of the invention comprises a cast, bronze material. The outer surface of the coupling is provided with a pair of spaced protruding portions 28 and 29 each of which is located a predetermined distance from an axial extremity of the coupling 26. The inner surface of the coupling 26 is provided with a pair of spaced annular grooves 30 each of which in the preferred embodiment of the invention is located generally radially opposite one of the spaced protruding portions 28 or 29. Seated in each of the grooves 30 is an annular resilient gasket 32 which is adapted to be deformed and urged into sealing engagement with the outer surface of the inner pipe 4 and the wall of the groove 30 as each end portion of the inner pipe 4 is inserted into the coupling. The inner surface of the coupling 26 is also provided with a radially inwardly extending projection 34 which, as illustrated in FIGS. 1 and 2, is adapted to be contacted by one axial extremity of the inner pipe 4 when it is inserted into the coupling 26. As described below, this relationship between one extremity of the inner pipe 4 and the projection 34 functions to cooperate with other components of the thermally insulated pipe 2 in the proper positioning of both extremities of the inner pipe 4 in associated adjacent pipes to provide automatic end separation and to provide for any axial expansion or contraction of the inner pipe 4. As described below and as illustrated in FIGS. 1 and 2, the coupling 26 is positioned in the annular member 10 so that the projecting portion 28 is seated in the groove 26.

Adjacent the other axial extremity 36, the thermally insulated pipe 2 is provided with a sealing member 38 having a central opening 40. In the preferred embodiment of the invention, the sealing member 38 comprises a resilient material such as rubber. The surface of the opening 40 in the sealing member 38 is slightly tapered to facilitate the positioning of it over the inner pipe but has an average diameter slightly less than the outer diameter of the inner pipe 4 so that when it is pushed over the outer surface of the inner pipe 4, as illustrated in FIG. 1, it is in sealing engagement therewith. The outer surface 42 of the sealing member 38 is generally cylindrical and has a diameter slightly greater than the inner diameter of the outer pipe 6 so that when it is inserted within the outer pipe 6, as illustrated in FIG. 1, it is in sealing engagement therewith. A portion 44 of the outer surface 42 is tapered so that the sealing member may be readily introduced into the outer pipe 6. As illustrated in FIG. 2, the sealing member 38 is inserted within the outer pipe 6 so that the axial distance between the axial extremity 36 of the inner pipe 6 and the axial end surface 46 of the sealing member 38 is greater than the axial distance between the surface 20 and the nearer radially extending portion of the abutment 12 of the annular member 10.

The annular space between the outer peripheral surface of the inner pipe 4 and the inner surface of the outer pipe 6 is filled with a thermal insulating material 48, which, in the preferred embodiment of the invention, comprises a foamed polyurethane. As described below, the foamed polyurethane is preferably foamed in place while the inner and outer pipes are mounted in coaxial assembled position. The annular member 10 and the sealing member 38 function to retain the foaming material in the desired position. Also, after the thermally insulated pipe 2 has been completed, these members protect the thermal insulating material from attack by any deleterious elements.

As illustrated in FIGS. 1 and 2, sufficient resinous material is introduced into the annular space between the inner and outer pipes so that the resinous material when foaming will enter into and fill the openings 24. This feature functions as an additional means for holding the annular member 10 in a desired position. It is further noted, as illustrated in FIGS. 1 and 2, that the foaming resinous materials move into a contiguous relationship around the protruding portion 29 to help hold the coupling 26 in the desired position.

A thermally insulated pipe 2, as illustrated in FIGS. 1 and 2, is formed by first assembling the annular member 10 and the coupling 26 by inserting the coupling 26 through the axial end surface 22 into the annular member 10 until the protruding portion 28 seats in the groove 25. A resilient gasket 32 is then seated in each of the grooves 30. In a separate operation, the outer peripheral surface of an inner pipe 4 is cleaned and coated with a suitable release coating such as a silicone resin. The coated inner pipe 4 is then placed loosely within an outer pipe 6, and the two pipes are raised to a desired temperature. One end of the inner pipe 4 is then inserted into the end of the coupling 26 that now projects out of the annular member 10 and is pushed into the coupling 26 until the axial extremity 5 of the inner pipe 4 contacts the projection 34. As the inner pipe 4 passes through the gasket 32 into the coupling 26, the gasket 32 is deformed and urged into sealing relationship with the wall of the groove 30 and the outer surface of the inner pipe 4. The annular member 10 is then inserted into the end of the outer pipe 6 until the axial extremity 8 contacts the abutment 12. As described above, the diameter of the cylindrical portion 14 is slightly greater than the inner diameter of the outer pipe 6 so that the surface 14 of the annular member 10 is in sealing engagement with the associated inner surface of the outer pipe 6.

The partially assembled pipes are now moved in proper position so that the components for the foamed in place polyurethane insulating material may be deposited into the annular space between the inner and outer pipes. After these components have been deposited into the annular space between the inner and outer pipes, a sealing member 38 is pushed over the end of the inner pipe 4 and inserted within the outer pipe 6. The movement of the sealing member 38 over the inner pipe 4 and into the outer pipe 6 is continued until the axial distance between the axial extremity 36 of the outer pipe 6 and the axial end surface 46 of the sealing member 38 is greater than the axial distance between the end surface 20 of the annular member 10 and the nearer radially extending portion of the abutment 12. The heat from the inner and outer pipes provides the proper temperature conditions for foaming the components deposited in the annular space so as to fill the annular space between the outer surface of the inner pipe and the inner surface of the outer pipe with foamed polyurethane. During the foaming of the thermal insulating material, the inner and outer pipes are held in coaxial relationship by the annular member 10 and the sealing member 38. As illustrated in FIG. 1, the foamed in place polyurethane fills the annular space between the inner and outer pipes and even enters into the fills the openings 24 in the annular member 10. Furthermore, the foamed polyurethane surrounds the coupling 26 so as to aid in retaining this coupling in a desired position relative to the outer pipe 6.

In using thermally insulated pipe of the instant invention to form a pipe line, the ends of adjacent pipes are joined in the manner illustrated particularly in FIG. 2. The end of the inner pipe 4 projecting out from the sealing member 38 is inserted into the adjacent end of the coupling 26. As the end of the inner pipe 4 moves into coupling 26, the end surface 20 of the annular member 10 moves into the associated end of the outer pipe 6. The lips 18 are deflected as the annular member 10 moves into the outer pipe 6 to be deformed into sealing engagement with the inner surface of the outer pipe 6. Relative movement between the coupling 26 and the inner pipe 4 in the thermally insulated pipe 2 in response to the force applied in inserting the axial extremity 3 into the coupling 26 is prevented by the contact between the axial extremity 5 of the inner pipe 4 and the projection 34. As the inner pipe 4 passes through the gasket 30 into the coupling 26, the gasket 32 is deformed and urged into sealing relationship with the wall of the groove 30 and the outer surface of the inner pipe 4. The relative movement of the various components is continued until the axial extremity 36 of the outer pipe 6 contacts the abutment 12, and the joint is completed. As illustrated in FIG. 2, the proper positioning of the axial extremity 3 within the coupling 26 may be visually observed and its contact with the gasket 32 felt before the axial extremity 36 contacts the annular member 10. As illustrated in FIG. 2, the axial extremity 3 of the inner pipe 4 is spaced axially from the projection 34 to allow for axial expansion of the inner pipe 4. Also, the axial extremity 3 enters into the coupling 26 an axial distance past the rubber gasket 32 to allow for axial contraction of the inner pipe 4. Thus, the various components cooperate to form a joint, as illustrated in FIG. 2, which automatically provides for either the axial expansion or contraction of the inner pipe 4 and eliminates the necessity for expansion loops or other means to provide for the expansion and contraction of the inner pipe 4.

As illustrated in FIG. 1 and as described above, the annular member 10 cooperates with the inner surface of the outer pipe 6 to seal against entry of fluids from outside the thermally insulated pipe to the inside thereof. In this manner, the thermal insulating material 46 is protected against deleterious elements from outside. It is noted that the pressure of any fluid seeking entry into the thermally insulated pipe will generally not exceed 10 p.s.i. The pressure seal for the fluid carried by the inner pipe is accomplished through the deformation of the annular sealing gaskets 32 seated in the grooves 30. These gaskets are designed to provide effective sealing at all pressures commensurate with the rating of the pipe. In the more widely used systems, the gasket 32 in the assembly illustrated in FIG. 2 will cooperate with the other components to provide proper sealing action at all pressures up to 525 p.s.i.

As described above, the outer surface of the inner pipe is coated with a release coating, such as a conventional silicone grease, prior to the foaming of the polyurethane. This prevents any bond between the outer surface of the inner pipe 4 and the foamed polyurethane so that the inner pipe 4 may move relative to the foamed polyurethane in response to any expansion or contraction forces from changes in the thermal conditions of the inner pipe 4. However, the foamed polyurethane does bond to the inner surface of the outer pipe 6, the annular member 10, the sealing member 38, and the coupling 26.

In one embodiment of the invention illustrated in FIGS. 1 and 2, the inner pipe 4 comprised a copper tubing having an inside diameter of 0.995 inch, a wall thickness of 0.065 inch, and an axial extent of about 10 feet. The outer pipe 6 comprised an asbestos-cement pipe having an inside diameter of 3.50 inches, a wall thickness of 0.37 inch, and an axial extent slightly less than 10 feet. The inner surface of the outer pipe had a coating comprising an epoxy resin formulation having a thickness of about 20 mils. The annular space between the outer surface of the inner pipe 4 and the inner surface of the outer pipe 6 had a radial thickness of approximately 1.25 inches which was filled with a foamed in place polyurethane thermal insulating material having a core density of about 3 pounds/cubic foot. The foamed polyurethane comprised the product formed by reacting an isocyanate with a resin component containing hydrogen at a temperature of about 150° F. The annular member 10 and the sealing member 38 were each formed from a suitable heat and ozone resistant rubber such as that marketed by E. I. du Pont de Nemours and Company under the trade designation "NORDEL." The annular resilient gasket 32 comprised a conventional heat and ozone resistant rubber for services from 0 to 525 p.s.i. In this embodiment of the invention, the thermally insulated pipe 2 had an axial extent of about 10 feet. One of the reasons for such length was due to the expansion and contraction characteristics of the material used in forming the inner pipe 4.

The embodiment of the invention illustrated in FIGS. 3 and 4 comprises a thermally insulated pipe 52 comprising an inner pipe 54 and an outer pipe 56. The inner and outer pipes may be made from any type of material, but in the embodiment illustrated in FIGS. 3 and 4, the inner pipe 54 comprises copper and the outer pipe 56 comprises a PVC plastic material. The outer diameter of the inner pipe 54 is less than the inner diameter of the outer pipe 56 so that when the inner and outer pipes are mounted in coaxial relationship, as illustrated in FIG. 3, an annular space exists between the outer surface of the inner pipe and the inner surface of the outer pipe. The annular member 60 has a central opening having a generally cylindrical surface 64.

Adjacent one axial extremity 58, the thermally insulated pipe 52 is provided with an annular sealing and retaining member 60. The outer surface 62 of the annular member 60 is generally cylindrical and has a diameter slightly greater than the inner diameter of the outer pipe 56 so that when it is inserted into the outer pipe 56 it will be in sealing engagement therewith. A portion of the outer surface 62 is tapered to facilitate the entry of the annular member 60 into the outer pipe 56. The annular member 60 is inserted into the outer pipe 56 until its surface 63 is generally planar with the axial extremity 58.

The ends of adjacent inner pipes 54 are joined as described below, by a coupling 66 which in the preferred embodiment of the invention comprises a cast, bronze material. The outer surface of the coupling 66 adjacent but spaced from one axial extremity thereof is provided with a radially inwardly extending groove 68 having a generally cylindrical surface 70. The diameter of the surface 70 is slightly greater than the diameter of the generally cylindrical inner surface 71 of the annular member 60 and the axial extent of the groove 68 is slightly greater than the axial extent of the annular member 60 adjacent the cylindrical surface 70 so that when the coupling 66 is inserted into the annular member 60, the annular member 60 will be seated in the groove 68 with the surfaces 70 and 71 in sealing engagement. The inner surface of the coupling 66 is provided with a pair of spaced grooves 72. Seated in each of the grooves 72 is an annular resilient gasket 74 which is adapted to be deformed and urged into sealing engagement with the outer surface of the inner pipe 54 and the wall of the groove 72 as each end portion of the inner pipe 54 is inserted into the coupling 66. The inner surface of the coupling 66 is also provided with a radially inwardly extending projection 76 which as illustrated in FIGS. 3 and 4 is adapted to be contacted by the axial extremity 55 of the inner pipe 54 when it is inserted into the coupling 66. As described below, this relationship between one extremity of the inner pipe 54 and the projection 76 functions to cooperate with other components of the thermally insulated pipe 52 in the proper positioning of both extremities of the inner pipe 54 to provide automatic end separation and to provide for any axial expansion or contraction of the inner pipe 54.

The annular space between the outer peripheral surface of the inner pipe 54 and the inner surface of the outer pipe 56 is filled with a thermal insulating material which, in the preferred embodiment of the invention, comprises a foamed polyurethane. As described below, the foamed polyurethane is preferably foamed in place while the inner and outer pipes are held in coaxial assembled position.

Adjacent the other axial extremity 78, the thermally insulated pipe 52 is provided with an imperforate annular sealing member 80 having a central opening 82. In the preferred embodiment, the sealing member 80 comprises a resilient material such as rubber. The surface of the opening 82 is slightly tapered so that it may be readily positioned over the inner pipe 54 but has an average diameter slightly less than the outer diameter of the inner pipe 54 so that when it is pushed over the outer surface of the inner pipe 54 it will be in sealing engagement therewith. The outer surface 84 of the sealing member 80 is generally cylindrical and has a diameter slightly greater than the inner diameter of the outer pipe 52 so that when a portion of the sealing member is inserted into the outer pipe 56, as illustrated in FIG. 4, the inserted portion of the surface 84 and the inner surface of the outer pipe 56 will be in sealing and frictional engagement. The outer surface 84 is also provided with a tapered entrance portion to facilitate entry of the sealing member 80 into the outer pipe 56.

As illustrated in FIG. 4, adjacent ends of the outer pipe 56 are joined with a coupling 86 comprising a generally cylindrical sleeve having a pair of spaced grooves 88 in the inner surface thereof. Seated in each of the grooves is another resilient gasket 90 which is adapted to be deformed and urged into sealing engagement with the outer surface of the outer pipe 56 and the wall defining the groove 88 as the end portion of the outer pipe 56 is inserted into the coupling 86. The outer pipe 56 is provided with tapered surfaces 92 to facilitate the entry of the pipe through the resilient gasket 90. The coupling 86 may be formed from any type of material but is generally similar to the material in the outer pipe 56.

The thermally insulated pipe 52 is formed by first assembling the sealing member 60 and the coupling 66 by inserting the coupling 66 into the sealing member 60 until the generally cylindrical surface 71 seats on the cylindrical surface 70. A resilient gasket 74 is then seated in each of the grooves 72. In a separate operation, the outer surface of an inner pipe 54 is cleaned and coated with a suitable release coating, such as a conventional silicone grease. The coated inner pipe 54 is then placed loosely with an outer pipe 56. One end of the inner pipe 54 is inserted into the end of the coupling 66 that now projects out of the sealing member 60 and is pushed into the coupling 66 until the axial extremity 55 of the inner pipe 54 contacts the projection 76. As the inner pipe 54 passes through the gasket 74 into the coupling 66, the gasket 74 is deformed and urged into sealing relationship with the wall of the groove 72 and the outer surface of the inner pipe 54. The sealing member 60 is then inserted into the outer pipe 56 until the axial end surface 64 is substantially even with the axial extremity 58 of the outer pipe 56. As described above, the diameter of the cylindrical surface 62 is slightly greater than the inner diameter of the outer pipe 56 so that the surface 62 is in sealing engagement with the associated inner surface 70 and 71 are also in sealing engagement.

The partially assembled pipes are now in proper position so that the components for the foamed in place polyurethane insulating material may be deposited into the annular space between the inner and outer pipes. After these components have been deposited into the annular space, a sealing member 80 is pushed over the end of the inner pipe 54 and inserted within the outer pipe 56. The movement of the sealing member 80 over the inner pipe 54 and into the outer pipe 56 is continued until a predetermined axial amount of the surface 84 of the gasket of the sealing member still protrudes from the axial extremity 78 of the outer pipe 56. The foaming of the components deposited in the annular space is continued so as to fill the annular space between the outer surface of the inner pipe and the inner surface of the outer pipe with foamed polyurethane. During the foaming of the thermal insulating material, the inner and outer pipes are held in coaxial relationship by the sealing members 60 and 80. The foamed polyurethane surrounds and bonds to the outer surface of the coupling 66 as illustrated in FIGS. 3 and 4, so as to aid in retaining the coupling 66 in a desired position.

The manner of forming a pipe line from thermally insulated pipe 52 of the instant invention is illustrated in FIGS. 3 and 4. The axial extremity 58 of an outer pipe 56 is inserted into a coupling 86 and moved in an axial direction past the resilient gasket 90 until the axial extremity reaches the approximate axial midpoint of the coupling 86. The axial extremity 78 of the adjacent thermally insulated pipe 52 is then introduced into the other portion of the coupling 86 and moved past the resilient gasket 90. During the movement of the outer pipe 56 into the coupling 86, the axial extremity 53 of the inner pipe 54 enters into the coupling 66 and moves past the resilient gasket 74. As the inner pipe 54 passes through the gasket 74 into the coupling 66, the gasket 74 is deformed and urged into sealing relationship with the wall of the groove 72 and the outer surface of the inner pipe 54. The movement of the inner and outer pipes is continued until the axial end surface 94 of the sealing member 80 contacts the axial end surface 64 of the sealing member 60 and the axial extremity of the coupling 66. As illustrated in FIG. 4, the axial extremity 53 of the inner pipe 54 is spaced from the projection 76 to allow for any axial expansion of the inner pipe 54. Also, the axial extremity 53 of the inner pipe 54 enters into the coupling 66 an axial distance past the rubber gasket 74 to allow for any axial contraction of the inner pipe 54. Thus, the various components cooperate to form a joint which, as illustrated in FIG. 4, automatically provides for either the axial expansion or contraction of the inner pipe 4. As described above, the outside surface of the inner pipe 54 is coated with a release coating prior to the foaming of the polyurethane. This prevents any bond between the outer surface of the inner pipe 54 and the foamed polyurethane so that the inner pipe 54 may move relative to the foamed polyurethane in response to any expansion or contraction forces from changes in the thermal conditions associated with the inner pipe 54. However, the foamed polyurethane does bond to the inner surface of the outer pipe 56, the sealing members 60 and 80, and the coupling 66 so as to retain these members in a desired relative position.

In one embodiment of the instant invention illustrated in FIGS. 3 and 4, the inner pipe 4 comprised a copper tubing having an inside diameter of 0.995 inch, a wall thickness of 0.065 inch, and an axial extent of about 10 feet. The outer pipe 56 comprised a PVC plastic material having an inside diameter 3.50 inches, a wall thickness of 0.135 inch, and an axial length of about 10 feet. The annular space between the outer surface of the inner pipe 54 and the inner surface of the outer pipe 56 had a radial thickness of approximately 1.25 inches which was filled with a foamed in place polyurethane material having a core density of about 4.5 pounds/cubic foot. The foamed polyurethane material comprised the product formed by reacting an isocyanate with a resin component containing hydrogen at a temperature of about 100° F. The coupling 86 comprised a PVC plastic material similar to that in the outer pipe 56. The sealing members 60 and 80 were formed from a suitable heat and ozone rubber such as that marketed by E. I. du Pont de Nemours and Company under the trade designation "NORDEL." The annular sealing gasket 74 and 90 were conventional rubber rings for service from 0 to 525 p.s.i.

In many instances such as overhead pipe lines, it is necessary to provide a joint having good thrust resistance. The thermally insulated pipes illustrated in FIGS. 5–7 are provided with thrust resistant means so as to provide the necessary resistance to any forces tending to separate or move the ends of adjacent pipe units away from each other. The thermally insulated pipe illustrated in FIGS. 5 and 6 is similar to that pipe illustrated in FIGS. 1 and 2 with the exception that the outer pipe 6 comprises a plastic material such as polyvinyl chloride. The thrust resistant means comprising a sleeve 100 comprising a plastic material such as polyvinyl chloride or glass reinforced resins and having an inside diameter greater than the outside diameter of the outer pipe 6. The sleeve 100 is secured to the outside surface of the outer pipe 6 by a suitable solvent cement 102 such as a solvent cement comprising a solution of polyvinyl chloride dissolved in a solvent system such as tetrahydrofuran and dimethylformamide.

As illustrated in FIG. 5, the preferred manner of making the assembly illustrated in FIG. 6 is to secure the sleeve 100 to the end of the outer pipe 6 adjacent the annular member 10 by the solvent cement so as to form a bell end. The outer surface of the outer pipe 6 adjacent the axial extremity 36 is coated with the solvent cement 102 so that when the joint is assembled as illustrated in FIG. 6, the ends of the adjacent outer pipes 6 will be secured to the sleeve by the solvent cement.

The thermally insulated pipe illustrated in FIG. 7 is similar to that pipe illustrated in FIGS. 3 and 4 with the exception that the outer pipe 56 comprises a plastic material such as polyvinyl chloride. The thrust resistance is provided in a manner similar to that illustrated in FIGS. 5 and 6 with the sleeve 100 being secured by solvent cement 102 to the outside surface of the outer pipe 56 adjacent the end adjacent the coupling 66 to form the bell end. The outer surface of the outer pipe 56 near the end having the annular member 80 is coated with a solvent cement 102 so that when the joint is assembled as illustrated in FIG. 7, the ends of the adjacent outer pipes 6 will be secured to the sleeve 100 by the solvent cement.

The instant invention provides a thermally insulated pipe system which is particularly suited for use with piping systems wherein the inner carrier pipe desirably has an inside diameter equal to or less than twelve inches. The invention provides a factory assembled thermally insulated pipe which is provided with a joint which is readily and uniformly assembled in any and all field conditions while also providing good thermal protection at the joint area. The invention also provides a unique coupling system utilizing a rubber ring or other compression sealing member joint in a metallic piping system and automatically provides for any expansion or contraction of the inner carrier pipe. Thus, a thermally insulated metallic piping system is provided that may be readily assembled in the field by merely pushing the metallic inner pipe into a coupling past a resilient gasket seated in an annular groove in the coupling. This eliminates the previous necessity for soldering the adjacent edges of the inner pipe in the field and then covering the soldered joint with a proper type of thermal insulation.

While the invention has been described in rather full detail, it will be understood that these details need not be strictly adhered to and that various changes and modifications may suggest themselves to one skilled in the art, all falling within the scope of the invention.

What we claim is:
1. Thermally insulated pipe comprising:
   (a) an inner and outer pipe in coaxial relationship,
   (b) said inner pipe having an outside diameter less than the inside diameter of said outer pipe to provide an annular space between said inner and said outer pipe,
   (c) a first coupling coaxial with said inner pipe and positioned on one axial extremity of said inner pipe,
   (d) at least a portion of said first coupling extending into said annular space,
   (e) said one axial extremity of said inner pipe terminating axially inwardly of one axial extremity of said outer pipe,
   (f) thermal insulating material substantially filling said annular space between said inner and said outer pipes and between the inner surface adjacent said one axial extremity of said outer pipe and the outer surface of said portion of said first coupling,
   (g) the other axial extremity of said inner pipe extending axially outwardly from the other axial extremity of said outer pipe and having a free outer surface for insertion into a first coupling carried by an adjacent thermally insulated pipe,
   (h) means for providing a fluid-tight seal between said first coupling and the associated ends of adjacent inner pipes,
   (i) a second coupling comprising an annular member positioned between and in contact with a portion of the outer surface of said first coupling and a portion of the inner surface of said outer pipe adjacent said one axial extremity of said outer pipe,
   (j) said second coupling having an annular portion extending axially outwardly from said one axial extremity of said outer pipe, and
   (k) means defining an annular space between the inner surface of said outer pipe adjacent the other axial extremity thereof and said free outer surface of said other axial extremity of said inner pipe, which annular space is adapted to receive said annular portion of said second coupling and a portion of said first coupling of an adjacent thermally insulated pipe.

2. Thermally insulated pipe as defined in claim 1 wherein said fluid-tight seal comprises:
   (a) said first coupling having a pair of spaced annular grooves in the inner surface thereof,
   (b) a sealing gasket positioned in each of the said annular grooves and cooperating with the outer surface of an associated inner pipe and the wall of said groove to form an effective fluid seal.

3. Thermally insulated pipe as defined in claim 2 and further comprising:
   (a) means comprising an abutment within said first coupling for positioning said one axial extremity of said inner pipe relative to said first coupling.

4. Thermally insulated pipe as defined in claim 3 wherein:
   (a) said inner pipe is metallic.

5. Thermally insulated pipe as defined in claim 3 wherein:
   (a) said outer pipe is asbestos-cement.

6. Thermally insulated pipe as defined in claim 1 and further comprising:
   (a) a third coupling comprising an annular sleeve having an inside diameter greater than the outside diameter of said outer pipe,
   (b) means securing a portion of the inner surface of said annular sleeve to a portion of the outer surface of said outer pipe adjacent an axial extremity,
   (c) said sleeve being secured to said outer pipe so as to extend axially outwardly from said outer pipe so as to form a bell end for the reception and securement of the outer pipe of an adjacent thermally insulated pipe.

7. A pipe system comprising:
   (a) a first unit comprising a thermally insulated pipe having an inner and an outer pipe mounted in coaxial relationship with thermal insulating material therebetween, each of said inner and outer pipes having a first and second end portion,
   (b) a second unit comprising a thermally insulated pipe having an inner and an outer pipe mounted in coaxial relationship with thermal insulating material therebetween, each of said inner and outer pipes having a first and a second end portion,
   (c) a first coupling coaxial with and positioned on said first end portion of said inner pipe of said first unit in a fluid-tight manner,
   (d) said second end portion of said inner pipe extending axially outwardly from the axial extremity of the second end portion of said outer pipe,
   (e) the axial extremity of said first end portion of said inner pipe terminating axially inwardly of the axial extremity of said first end portion of said outer pipe,
   (f) said first coupling having at least one annular groove therein,
   (g) an annular resilient gasket seated in said groove,
   (h) said second end portion of said inner pipe of said second unit being inserted into said first coupling so that said annular resilient gasket is deformed to effect a fluid-tight seal between said first coupling and said second end portion of said inner pipe of said second unit,
   (i) means for providing automatic end separation between said first end portion of said inner pipe of said first unit and said second end portion of said inner pipe of said second unit to provide for any expansion or contraction of said inner pipe,
   (j) a second coupling comprising an annular member positioned between and in contact with the outer surface of at least a portion of said first coupling and the inner surface of said first end portion of said outer pipe of said first unit,
   (k) said annular member having an outer surface projecting axially outwardly from the axial extremity of said first end portion of said outer pipe of said first unit, and
   (l) said axially projecting outer surface of said second coupling being in contact with the inner surface of said second end portion of said outer pipe of said second unit.

8. A pipe system as defined in claim 7 and further comprising:
   (a) means for retaining said first coupling in a substantially fixed position relative to said thermal insulating material.

9. A pipe system as defined in claim 7 wherein said first coupling is joined to said first end portion of said inner pipe of said first unit by means comprising:
   (a) a second annular groove in said coupling,
   (b) an annular resilient gasket seated in said second groove, and
   (c) said first end portion of said inner pipe of said first unit being inserted into said first coupling so that said annular resilient gasket is deformed to effect a fluid-tight seal between said first coupling and said first end portion of said inner pipe of said first unit.

10. A pipe system as defined in claim 9 and further comprising:
    (a) means on said first coupling adapted to be contacted by the axial extremity of said first end portion of said inner pipe of said first unit to position said axial extremity of said first end portion of said inner pipe relative to said coupling so that said automatic end separation may be obtained.

11. A pipe system as defined in claim 10 wherein:
    (a) said inner pipe in said first and said second units is metallic.

12. A pipe system as defined in claim 7 and further comprising:
    (a) a third coupling comprising an annular sleeve having an inside diameter greater than the outside diameter of an associated portion of the outer pipe, and
    (b) means securing portions of the inner surface of said sleeve to associated portions of each of said outer pipes to provide resistance to any force tending to move the associated ends of said first and second units away from each other.

13. A pipe system comprising:
    (a) a first unit comprising a thermally insulated pipe having an inner and an outer pipe mounted in coaxial relationship with thermal insulating material therebetween, each of said inner and outer pipes having a first and a second end portion,
    (b) a second unit comprising a thermally insulated pipe having an inner and an outer pipe mounted in coaxial relationship with thermal insulating material therebetween, each of said inner and outer pipes having a first and a second end portion,
    (c) a first coupling coaxial with and positioned on said first end portion of said inner pipe of said first unit in a fluid-tight manner,
    (d) said second end portion of said inner pipe extending axially outwardly from the axial extremity of the second end portion of said outer pipe,
    (e) the axial extremity of said first end portion of said inner pipe terminating axially inwardly of the axial extremity of said first end portion of said outer pipe,
    (f) said first coupling having at least one annular groove therein,
    (g) an annular resilient gasket seated in said groove,
    (h) said second end portion of said inner pipe of said second unit being inserted into said first coupling so that said annular resilient gasket is deformed to effect a fluid-tight seal between said first coupling and said second end portion of said inner pipe of said second unit,
    (i) means for providing automatic end separation between said first end portion of said inner pipe of said first unit and said second end portion of said inner pipe of said second unit to provide for any expansion or contraction of said inner pipe,
    (j) said means for providing end separation between the end portions of the inner pipes, also providing automatic end separation between said first end portion of said outer pipe of said first unit and said second end portion of said outer pipe of said second unit to provide for any expansion or contraction of said outer pipe.

14. A pipe system as defined in claim 13 wherein said means for providing automatic end separation comprises:
    (a) a member comprising an annular ring positioned between and in contact with the inner surface of said second end portion of said outer pipe and the outer surface of a portion of said inner pipe,
    (b) said member projecting axially outwardly from the axial extremity of said second end portion of said outer pipe, and
    (c) said member contacting said first coupling member when said first and second units are assembled to provide said automatic end separation.

15. A pipe system as defined in claim 14 and further comprising:
    (a) a second coupling comprising an annular sleeve having an inside diameter greater than the outside diameter of an associated portion of the outer pipe, and
    (b) fluid-sealing means between said annular sleeve and the associated portions of the outer pipes.

16. A pipe system as defined in claim 14 and further comprising:
    (a) a second coupling comprising an annular sleeve having an inside diameter greater than the outside diameter of an associated portion of the outer pipe, and (b) means securing portions of the inner surface of said sleeve to associated portions of each of said outer pipes to provide resistance to any force tending to move the associated ends of said first and second units away from each other.

References Cited

UNITED STATES PATENTS

| | | | |
|---|---|---|---|
| 247,207 | 9/1881 | Mershon | 285—137 X |
| 528,291 | 10/1894 | Cummings | 285—47 |
| 530,951 | 12/1894 | Pointe et al. | 285—55 X |
| 666,241 | 1/1901 | Barraclough | 285—55 |
| 2,085,441 | 6/1937 | Murray et al. | 285—55 X |
| 2,610,028 | 9/1952 | Smith | 285—55 X |
| 2,998,269 | 8/1961 | Houghton | 285—423 X |
| 3,208,539 | 9/1965 | Henderson | 285—302 X |
| 3,276,929 | 10/1966 | Ferch | 285—369 X |

FOREIGN PATENTS 228,017  6/1963  Austria.

DAVID J. WILLIAMOWSKY, Primary Examiner

D. W. AROLA, Assistant Examiner

U.S. Cl. X.R.

138—149; 285—138, 187, 345, 369